US005745901A

United States Patent [19]
Entner et al.

[11] Patent Number: 5,745,901
[45] Date of Patent: Apr. 28, 1998

[54] WORKFLOW INITIATED BY GRAPHICAL SYMBOLS

[75] Inventors: Diane T. Entner, Fairfax; Phyllis J. Wormington, Vienna; Chih Ru Lin, Fairfax, all of Va.

[73] Assignee: Kodak Limited, Harrow, England

[21] Appl. No.: 337,388

[22] Filed: Nov. 8, 1994

[51] Int. Cl.[6] .................................................. G06F 17/30
[52] U.S. Cl. .......................... 707/103; 395/204; 395/751; 707/10; 707/102
[58] Field of Search .................................... 395/600, 614, 395/610, 613, 204, 751; 364/419, 401

[56] References Cited

U.S. PATENT DOCUMENTS

| | | | |
|---|---|---|---|
| 5,144,557 | 9/1992 | Wang et al. | 364/419 |
| 5,168,444 | 12/1992 | Cukor et al. | 364/401 |
| 5,191,522 | 3/1993 | Bosco et al. | 364/401 |
| 5,208,748 | 5/1993 | Flores et al. | 364/419 |
| 5,216,603 | 6/1993 | Flores et al. | 364/419 |
| 5,231,578 | 7/1993 | Levin et al. | 364/419 |
| 5,247,661 | 9/1993 | Hager et al. | 395/600 |

OTHER PUBLICATIONS

S. R. Desai, "BaseWorx™ Platform for Building Object–Oriented Management Applications", IEEE, pp. 194–201 Jan. 1993.

Dirk Wodtke et al., "The Mentor Project: Steps Towards Enterprise–Wide Workflow Management", IEEE, pp. 556–565, Jan. 1996.

Mary Ann Richardson, "Workflow Management Software", Document Imaging Systems, Related Technologies, pp. 1–10 May 1993.

*Primary Examiner*—Thomas G. Black
*Assistant Examiner*—Cheryl R. Lewis
*Attorney, Agent, or Firm*—Antonelli, Terry, Stout & Kraus, LLP

[57] ABSTRACT

A method for workflow processing of objects stored in the memory of a computer system in accordance with the invention includes storing an object, which is to be processed, in the memory of a computer system; reading the object, which is to be processed, from the memory, and adding a graphical symbol to the object; processing the graphical symbol with middleware; and in response to the processing of the graphical symbol with the middleware initiating actions to process the object in accordance with business rules; and wherein the graphical symbol is an object which, when interpreted by the middleware into a computer readable format, initiates an action resulting in the use of at least one tool to process the object with each tool performing a different operation on the object or at least one additional object event or changing at least one attribute of the object, based on business rules, with the rules being comprised of at least one of the set of controls or procedures under which a computer implemented business process is conducted.

24 Claims, 3 Drawing Sheets

Microfiche Appendix Included
(2 Microfiche, 125 Pages)

WORKFLOW INITIATED BY GRAPHICAL SYMBOLS

TECHNICAL FIELD

The present invention relates to workflow processes.

Microfiche Appendix

An implementation of the invention is found in a microfiche appendix, containing 2 microfiche and 125 frames.

BACKGROUND ART

FIG. 1 illustrates a block diagram of a typical prior art workflow system 10 which permits objects to be processed by a hardware server 12 controlled by a processor 13 to control routing of objects under the control of workflow software 14 which is stored in a memory which is accessible by a plurality of PCs 16 of conventional design. The workflow software provides the objects processed by the software 14 to an object routing function which may be considered to be a forwarding of the object to a destination for further processing such as to electronic mail associated with the PCs 16. Objects 18 are entered into a memory of the hardware server or a memory of the PCs 16 and forwarded to the hardware server 14 when they are processed with software stored in the memory. A viewer tool in the application's programs of the PCs 16 displays the objects or attributes of the object received from hardware server 12.

Workflow processing follows a standard sequence. A user interacts with the object in the viewer. When the user actions are complete, the workflow software routes the object based on its data attributes.

The workflow software 14 may include business rules and a programmed state machine to control the routing function of the object. The hardware server 12 permits shared access by the user's of the PCs 16. The PC 16 provides a user interface to the hardware server 12 and performs a subset of the application software processing.

As stated above, the workflow software 14 contained within the hardware server 12 functions as an object router which permits routing of the processed objects to applications such as electronic mail.

In all forms of workflow, an electronic form is used. Based upon the attributes entered in the form, the object is routed.

Various companies market workflow software such as Action Technology, Inc. of Alameda, Calif. U.S. Pat. Nos. 5,208,748 and 5,216,603, which are assigned to Action Technology, Inc., disclose workflow processing. Numerous other companies provide workflow software.

There are at least two types of workflow engines. One type is the conditional workflow engine. Conditional workflow engines determine and control route branching for the object. Another type is the state machine workflow engine which provides a set of predetermined actions. The state machine workflow engine is illustrated within the software of FIG. 1.

Workflow software may be thought of as a method of automatically routing objects over a network to users responsible for working with the objects. Current workflow architectures use a form and text based interface to determine which of a plurality of business rules should be initiated.

While the state of the art with workflow software is highly useful, it has several recognized deficiencies. Users must have specific procedures and controls to insure that accurate text has been entered and computer based forms must be developed into which users enter information. Thus, current workflow software does not have a high degree of versatility and has limited functional capability. The current versatility of workflow is limited because users must have a high degree of knowledge of the business process, be skilled at determining and entering correct attributes; and be experienced in using computer command knowledge.

U.S. Pat. Nos. 5,144,557, 5,231,578 and 5,247,661 describe systems respectively for processing of documents including the transferring of documents within a data processing system, the use of an electronic stylus to annotate documents and the automated distribution of electronic documents to a preselected list of recipients.

DISCLOSURE OF INVENTION

Glossary

The following definitions shall apply to terms used herein as follows.

(1) Object—An object is a self-contained module of data and its associated processing. Objects are diverse in nature and, for example, include text, graphics, sound, video and scanned pages.

(2) Workflow—Workflow is a method of automatically routing objects, such as data and documents, over a network to users who are next responsible for working with the objects. Workflow may be defined as a process which, through the use of business rules, a sequence human or computer actions is initiated and controlled.

(3) Business Rules—Business rules are at least one of the set of controls or procedures by which a computer implemented business process is conducted.

(4) Computer Implemented Business Process—A computer implemented business process is a method of using computer technology and business rules stored in the memory of the computer to carry out automated actions.

(5) Middleware—Middleware is a program module, such as a dynamic link library or shared library, that provides a service to a client application allowing the client application to communicate with a server application. The workflow dynamic link library is a preferred form of the middleware of the present invention.

(6) Dynamic Link Library—A dynamic link library is a program module that can be dynamically loaded and linked by an application at run time of the operating system of a computer.

(7) Attribute—An attribute is a property of an object. Properties provide information about the object, such as data associated with the object, e.g. title, date, status, price, vendor name, etc.

(8) State Machine—A sequential-logic system whose outputs depend on previous and present inputs.

(9) Tools—An interactive application program or hardware that helps a user customize, adapt or work with objects.

(10) Graphical Symbol—A graphic or a graphic representation of text which, when interpreted by the computer, initiates an action resulting in the use of at least one tool, or initiates at least one additional event or modifies at least one attribute of the object based on business rules.

(11) Event—An action resulting in processing of an object including, but not limited to, routing of the object for additional processing.

(12) Form—A form is a disciplined method of capturing character-based information which may be stored in a database.

The present invention is an improved workflow method for processing objects because it is easier for users to understand, to implement and to control the next applicable actions of object processing. The user adds graphical symbols to the object to control the next applicable actions of object processing.

The direct results of workflow initiated by graphical symbols are ease of training personnel, access to clear decision paths and enjoyable methods of processing of objects with workflow software which have not been achieved by prior art workflow processing. Furthermore, the invention increases workflow productivity and provides workflow users with enhanced processing capability by easing the selection of business rules to process objects.

Workflow users interact with the system as follows. The graphical symbol and object are processed using middleware. The middleware causes the workflow software to initiate actions to process the object in accordance with the business rules. The middleware interprets the graphical symbol to convert the graphical symbol into a computer readable format. The result of the interpretation is passed to a state machine. The state machine uses the result to determine which of the business rules are to be enacted. The present invention uses the graphical symbol as applied to an object to command the computer system to choose the business rules.

A method for workflow processing of objects stored in a memory of a computer system in accordance with the invention includes storing an object which is to be processed in the memory of the computer system; reading the object which is to be processed from the memory and adding a graphical symbol to the object; processing the graphical symbol with middleware; and, in response to processing of the graphical symbol with the middleware, initiating actions to process the object in accordance with business rules; and wherein the graphical symbol is an object which, when interpreted by the middleware into a computer readable format initiates an action resulting in the use of the at least one tool to process the object with each tool performing a different operation on the object, or at least one additional event, or changing at least one attribute of the object based on business rules. Further, in accordance with the present invention, a state machine uses the computer readable format provided by the middleware to process the graphical symbol and the object to which the graphical symbol is attached in accordance with business rules selected by the state machine. Further, in accordance with the invention, the state machine is preferably defined as having at least three predefined states for selecting business rules.

The plurality of tools which perform different operations on the objects may be without limitation a printer, electronic communications containing the object and graphical symbol which include without limitation facsimile, interactive voice response, call back, facsimile back, electronic mail, RF transmission and telephony transmission. Further tools comprise a database server, a scanner, an object server and application softwares. Without limitation the application softwares include optical character recognition (OCR), compound document preparation and processing, spreadsheet preparation and processing, decision making software, graphics preparation and processing, object linking and embedding (OLE) and custom applications.

Furthermore, in accordance with the invention, at least one additional event may be routing of the object for additional processing.

The attribute modification process may include without limitation, modification of object data attributes, such as title, date, price, vendor name, and status, etc.

BEST MODE FOR CARRYING OUT THE INVENTION

Figure 1:
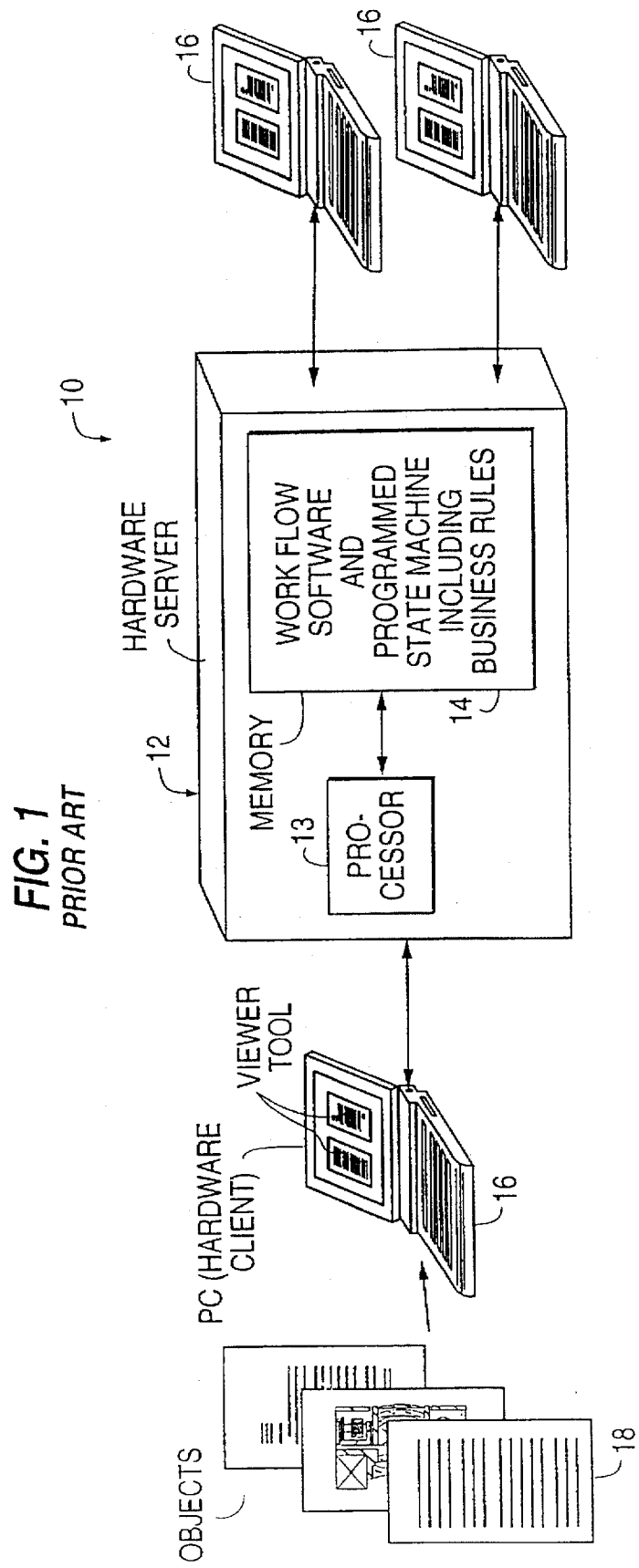
FIG. 1 is a block diagram representing a prior art data processing system containing workflow processing.
Figure 2:
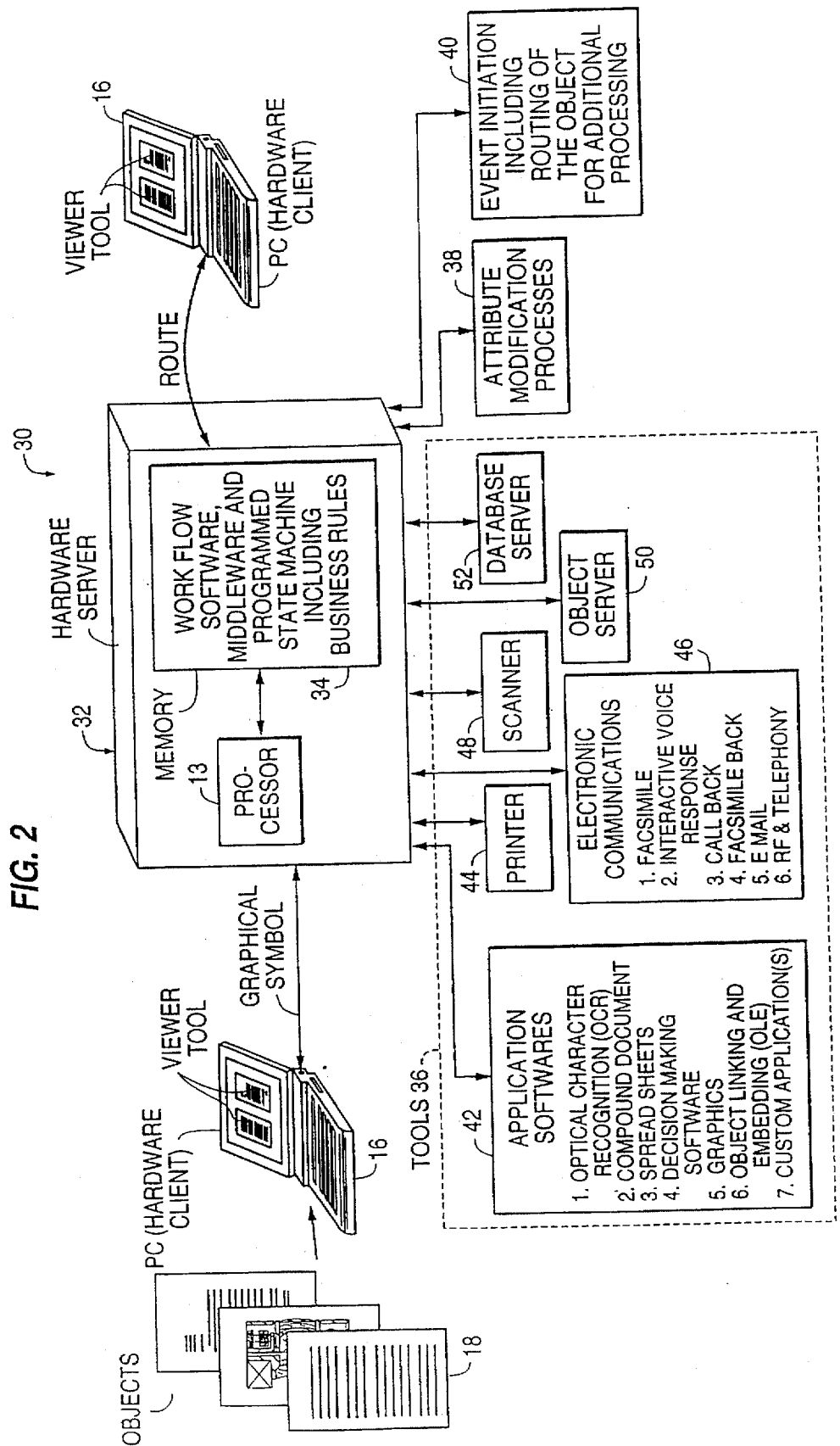
FIG. 2 is a block diagram of a data processing system containing workflow processing in accordance with the present invention.

FIG. 2 illustrates a block diagram of a computer system 30 which performs the workflow process of the present invention. Like reference numerals identify like parts in FIGS. 1 and 2. The Appendix contains a code listing of an embodiment of middleware in the form of a dynamic link library which is used in accordance with the present invention in association with other conventional aspects of data processing systems for performing workflow processing as illustrated in the prior art of FIG. 1. Workflow software marketed by Action Technology, Inc. of Alameda, Calif., has been used with the middleware of the Appendix to practice the workflow process of the invention.

The present invention provides a substantial improvement over the prior art workflow processing by using graphical symbols to initiate workflow actions on objects. The graphical symbols are attached by the user of a viewer tool of the PC 16. The graphical symbols and objects are processed by the middleware within hardware server 32. The middleware interprets the graphical symbols into a computer readable format which is passed to the state machine which selects the business rules.

The difference in the workflow processing achieved by the system of FIG. 2 compared to the system of FIG. 1 is the use of graphical symbols to initiate workflow actions and the use of middleware in the hardware server 32.

The business rules as implemented through the state machine initiates one of three types of actions. These actions are tool selection 36, attribute modification 38 or event initiation 40. In the system 30 of FIG. 2, the sets of possible business rules which may be selected for object processing are associated with or are contained within the state machine. It should be noted that the present invention is not limited to any form of coding of business rules or the use of a state machine.

As illustrated in FIG. 2, the tools 36 may be application software(s) 42 which include without limitation OCR processing, compound document processing, spreadsheet processing, decision making software, graphics, object linking and embedding software and custom applications software, a printer 44, communications functions 46 containing the object and graphical symbol which may include without limitation, facsimile, interactive voice response, callback, and facsimile back, electronic mail, RF transmission of the object and graphical symbol and telephony transmission of the object and graphical symbol, a scanner 48, object server 50 and database server 52. Each of the tools are well known in the art and do not constitute part of the present invention.

Furthermore, as stated above, the actions initiated by the middleware may include any attribute modification process

38. Without limitation, attribute modification processes in accordance with the present invention include updating database values as, for example, described above. It should be understood that the present invention is not limited to any particular attribute modification process 38.

The initiation of additional events 40 by the computer system includes without limitation routing of the object for additional processing.

Figure 3:
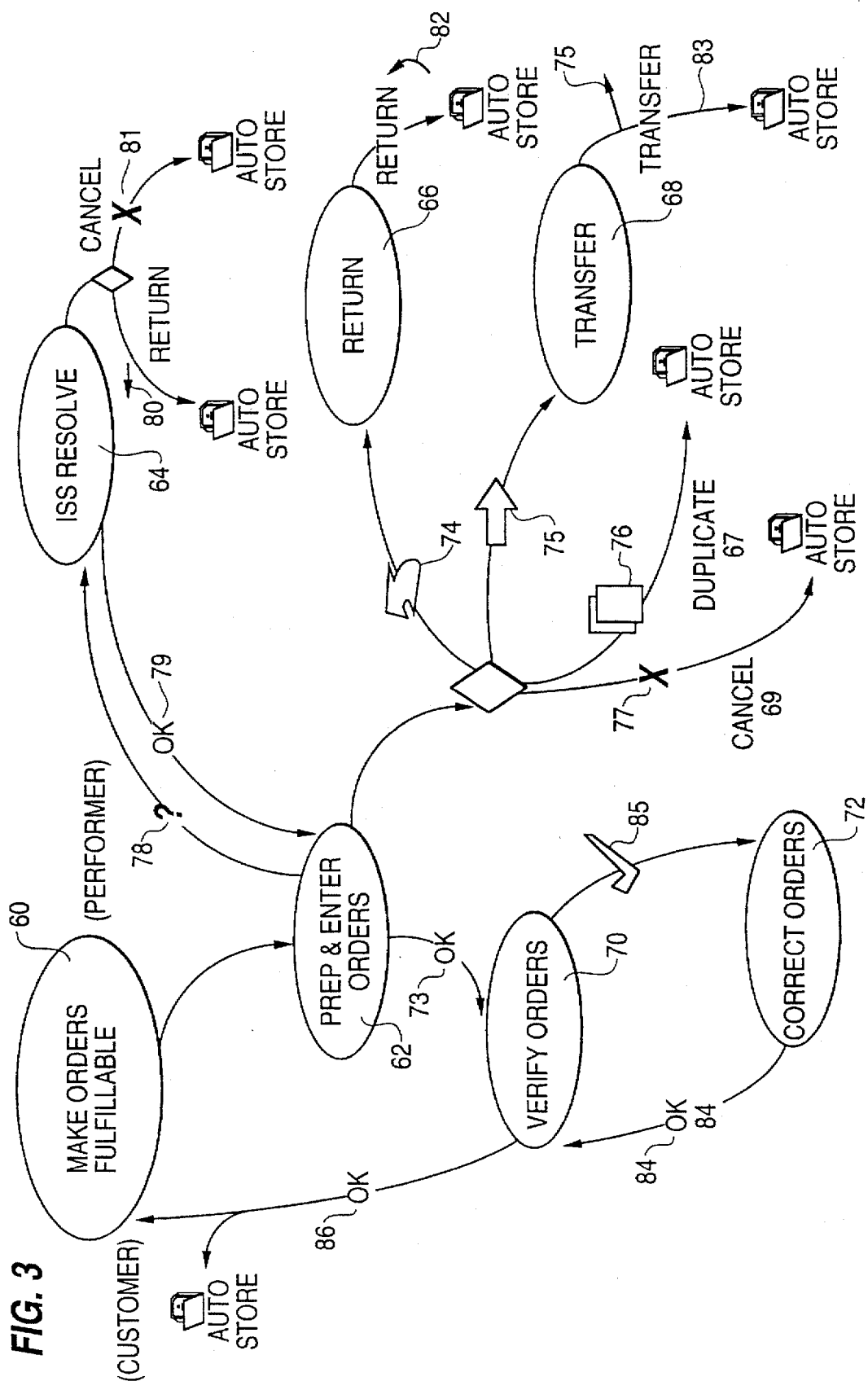
FIG. 3 is a flow diagram of processing of objects in accordance with the present invention.

Interaction of the PC client 16 under the control of the human user and the hardware server 32 software of the present invention is described as follows. The graphical symbol is used to initiate workflow actions based on business rules as defined above. The objects are entered into the memory of the hardware server 32 and are presented to the user (client) through the viewer tool which provides a way for users to view and take actions on the object. The viewer tool has at least a presentation window for viewing the object, a pane in which to view the object attributes and a pallet of graphical symbols as defined above which may be applied to the object. Examples of a pallet of graphical symbols are illustrated in FIG. 3. Graphical symbols may be diverse in nature and may include icons such as the symbol "OK", "?", "X", a curved arrow, a straight arrow, a depiction of multiple copies of a document, such as the illustration of the objects 18 in FIGS. 1 and 2. The viewer provides methods to "Get Work" which obtains the next object, and to "Return Work" which returns the processed object to the workflow software on the workflow server for further actions.

User processing of objects in the computer system 30 is further described as follows. The objects are obtained, viewed and accessed for processing by pressing a "Get Work" button (not illustrated). With a view of the object, the user processes the object and may enter new attribute values as required by the business process. Once the user is finished processing the object, the user selects a graphical symbol appropriate for the completion status, applies the symbol to the layer on the surface of the presented object, and selects the "Return Work" button to return the object to control of the workflow software on the server 32.

The workflow system is further described as follows. The viewer tool of the PC 16 provides the object and its graphical symbol to the workflow services application program interface (middleware) residing on the hardware server 32 which in turn supplies an interface between the viewer tool of the PC 16 and the workflow server. The workflow server 32 provides access to the programmed state machine which includes or is associated with the business rules and to the workflow middleware. As has been discussed above, the middleware interprets the graphical symbol, passes the interpretation to the state machine which selects and processes business rules. Following completion of the next action, control of the object is returned to the workflow services software 34. Using the workflow services software 34, the object workflow attributes are modified to indicate the changed state of the object.

FIG. 3 illustrates processing of objects with multiple workflow selections in accordance with the present invention. FIG. 3 is an illustration of a sample workflow showing the method in which graphical symbols are used to determine next actions in an order fulfillment business process which is a typical application for workflow software. The business process, as shown in FIG. 3, consists of six possible workflows which may be initiated after an order is received. A total of fourteen potential next workflow actions or steps may be taken as part of the order placement process. Next available actions are determined based on the current and past states of the object within the workflows.

The following description is an overview of the way users interact with the sample workflow using graphical symbols and the business rules to determine the next steps in the workflows.

The business process is initiated by entering the object into the memory of the hardware server of a workflow enabled computer system, such as that illustrated in FIG. 2. The object may be entered into the memory of computer system 30 with a scanner or any one of several computer tools which create computer files. The object is stored in the memory of the computer system until it is requested by or is automatically presented to the user of the viewer tool of the PC 16.

With reference to FIG. 3, the first workflow 60 is Make Orders Fulfillable, a typical business process. The workflow services software 34 enters the object identification number in the workflow system 30. From that time until the workflow business process is completed, the object is managed by the workflow system 30. Control of the object moves from the PC 16 to the workflow server 32 as actions are taken on the object. It should be understood the processing of objects through the workflows involves the iterative application of the graphical symbol by the user. The six workflows are as follows:

Make Orders Fulfillable 60 is the workflow in which order processing is automatically initiated.

Prep and Enter Orders 62 is the first workflow in which the user may take an action on the order. In this workflow users review and ensure that orders are complete.

ISS Resolve 64 is a workflow which is enacted by the Prep and Enter performer when the performer requires additional assistance from the Inside Sales Support department. In this workflow ISS Resolve 64 adds additional information to the order so processing may continue.

Return 66 is a workflow which may be enacted by Prep and Enter performer to return an order to a customer.

Transfer 68 is a workflow which may be enacted by the Prep and Enter performer to transfer an order to another department for additional processing.

Duplicate 67 is a computer initiated workflow in which duplicate orders are automatically removed from the Make Order Fulfillable workflow.

Cancel 69 is a computer initiated workflow in which customer canceled orders are automatically removed from the Make Orders Fulfillable workflow.

Verify Orders 70 is a workflow in which orders are audited for accuracy.

Correct Orders 72 is a workflow in which inaccurate orders are corrected.

Orders move through workflows by application of the graphical symbols. For each workflow specific graphical symbols may be added. The following are the graphical symbols that may be applied to each workflow.

Prep and Enter Orders Workflow 62

The graphical symbol "OK" 73 moves the order to the Verify Orders workflow. The graphical "?" 78 moves the order to the ISS Resolve workflow. The curved arrow, graphical symbol 74, moves the order to the Return workflow. The arrow, graphical symbol 75, moves the order to the Transfer workflow. Two rectangles, graphical symbol 76, move the order to the computer initiated Duplicate workflow, and automatically stores the order in the Duplicate Order archives. The "X", graphical symbol 77, moves the order to the computer initiated Cancel workflow 69, and automatically stores the order in the Canceled Order archives.

ISS Resolve Workflow 64

The "OK", graphical symbol 79, returns the order to the Prep and Enter Orders workflow 62. The curved arrow, graphical symbol 80, returns the order to the customer. The "X", graphical symbol 81, moves the order to the computer initiated Cancel workflow, and automatically stores the order in the Canceled Order archives.

Return Workflow 66

The curved arrow, graphical symbol 82, returns the order to the customer, and automatically stores the order in the Return Order archives.

Transfer Workflow 68

The arrow, graphical symbol 75, transfers the order and automatically stores the order in the Transferred Order archives.

The Verify Orders Workflow 70

The "OK", graphical symbol 86, completes the Make Orders Fulfillable workflow 60 and automatically stores the order in the Completed Order archives. The check mark, graphical symbol 85, moves the order to the Correct Orders workflow.

Correct Orders Workflow 72

The "OK", graphical symbol 84, returns the order to the Verify Orders workflow.

As is illustrated in the example of FIG. 3, the actions which are initiated by the cooperation of the middleware and the state machine and associated business rules are primarily the operation of routing the object and graphical symbol to destinations for further processing. However, other sample workflows in accordance with the invention may involve substantial use of tools 36 or attribute modification processes.

The foregoing description of an example of processing of multiple workflows in accordance with the invention under the control of added graphical symbols is not intended to be in any way limiting of the present invention and is provided for the purpose of explaining the simplicity of the adding of the graphical symbol as an effective control mechanism for controlling subsequent actions to be taken on the object including initiation of the use of the tools 36, initiation of events, or the modification of attributes of the object 40.

The elements of the present invention illustrated in the system diagram of FIG. 2 may be chosen from existing workflow systems including existing hardware and software from commercial sources with middleware such as, but not limited to, the dynamic link library of the Appendix. The present invention is not limited to the use of a dynamic link library. It should be understood that numerous modifications may be made to the middleware and to the system of FIG. 2 while practicing the present invention. It is intended that all such modifications fall within the scope of the appended claims.

We claim:

1. A method for workflow processing of objects stored in a memory of a computer system comprising:

storing an object, which is to be processed, in the memory of the computer system;

reading the object, which is to be processed, from the memory and adding a graphical symbol to the object;

processing the graphical symbol and object with middleware, with the middleware being a program module providing a service to a client application allowing the client application to communicate with a server application; and in response to the processing of the graphical symbol with the middleware, initiating actions to process the object in accordance with business rules, with the business rules being at least one of a set of controls or procedures by which a computer implemented business process is conducted; and wherein the graphical symbol is an object which, when interpreted by the middleware into a computer readable format, initiates an action resulting in the use of at least one tool to process the object with each tool performing a different operation on the object or at least one additional event or changing at least one attribute of the object, based on the business rules.

2. A method in accordance with claim 1 wherein:

a state machine uses the computer readable format to process the object in accordance with the business rules.

3. A method in accordance with claim 2 wherein:

the state machine is defined as having at least three predefined states for selecting business rules.

4. A method in accordance with claim 3 wherein:

the at least one tool comprises a printer.

5. A method in accordance with claim 3 wherein:

the at least one tool comprises sending electronic communications containing the object and graphical symbol.

6. A method in accordance with claim 3 wherein:

the at least one tool comprises a scanner.

7. A method in accordance with claim 3 wherein:

the at least one tool comprises an object server.

8. A method in accordance with claim 3 wherein:

the at least one tool comprises a data base server.

9. A method in accordance with claim 3 wherein:

the at least one tool comprises application software.

10. A process in accordance with claim 3 wherein:

the at least one additional event is routing of the object for additional tool processing.

11. A method in accordance with claim 2 wherein:

the at least one tool comprises a printer.

12. A method in accordance with claim 2 wherein:

the at least one tool comprises sending electronic communications containing the object and graphical symbol.

13. A method in accordance with claim 2 wherein:

the at least one tool comprises a scanner.

14. A method in accordance with claim 2 wherein:

the at least one tool comprises an object server.

15. A method in accordance with claim 2 wherein:

the at least one tool comprises a data base server.

16. A process in accordance with claim 2 wherein:

the at least one tool comprises application software.

17. A process in accordance with claim 2 wherein:
the at least one additional event is routing of the object for additional tool processing.

18. A method in accordance with claim 1 wherein:
the at least one tool comprises a printer.

19. A method in accordance with claim 1 wherein:
the at least one tool comprises sending electronic communications containing the object and graphical symbol.

20. A method in accordance with claim 1 wherein:
the at least one tool comprises a scanner.

21. A method in accordance with claim 1 wherein:
the at least one tool comprises an object server.

22. A method in accordance with claim 1 wherein:
the at least one tool comprises a data base server.

23. A method in accordance with claim 1 wherein:
the at least one tool comprises application software.

24. A process in accordance with claim 1 wherein:
the at least one additional event is routing of the object for additional tool processing.

* * * * *